Aug. 27, 1935.  F. J. GORIUP  2,012,343
TOY VEHICLE
Filed June 14, 1935
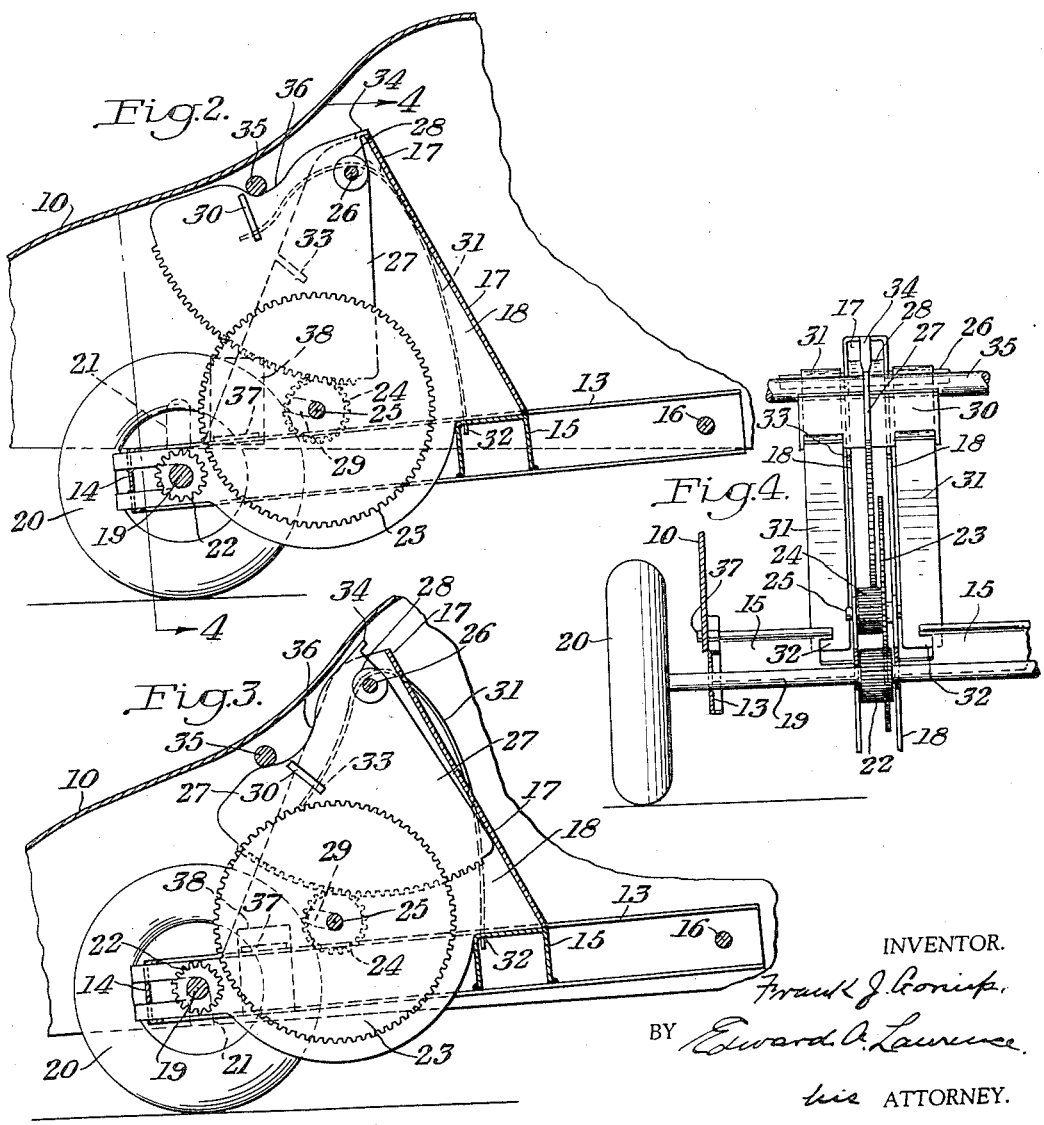
INVENTOR.
Frank J. Goriup
BY Edward A. Laurence
his ATTORNEY.

Patented Aug. 27, 1935

2,012,343

UNITED STATES PATENT OFFICE 2,012,343

TOY VEHICLE

Frank J. Goriup, McKees Rocks, Pa., assignor to Wolverine Supply and Manufacturing Company, Pittsburgh, Pa., a corporation of Pennsylvania Application June 14, 1935, Serial No. 26,655

7 Claims. (Cl. 46—48)

My invention relates to toy vehicles, such for instance as toy motor vehicles, and it comprises a new and improved spin-motor mechanism to cause the vehicle to travel over the floor or other surface.

In my invention the driving wheels, which are usually the rear wheels, are mounted on a supplementary frame which is connected to the vehicle body and arranged for limited movement relative to the latter. Carried by the frame are spring means which are compressed by such relative movement in one direction and whose abrupt expansion, when the force producing such movement is relieved, causes the driving wheels to rotate and thus cause the vehicle to travel.

Means are provided for preventing the rotation of the driving wheels as the spring means are compressed.

In the accompanying drawing, wherein I have illustrated a practical embodiment of the principles of my invention, Fig. 1 is a side elevation of a toy automobile to which my invention has been applied, the driving mechanism being shown in dotted lines and the spring being shown expanded.

Fig. 2 is an enlarged longitudinal section of the rear portion of the vehicle, showing the spring expanded.

Fig. 3 is a like view with the spring compressed.

Fig. 4 is a partial rear elevation showing the spring expanded.

Referring to the drawing, 10 represents the vehicle body which may be stamped or otherwise formed of metal. 11 represents the front wheels which are mounted on the axle 12 which in turn supports the forepart of the body 10.

The rear portion of the body 10 has no floor so as to provide clearance for the supplemental frame. Such frame comprises two parallel side beams 13 which are spaced apart and rigidly connected by the rear cross bar 14, and also intermediately of their ends by the cross beam 15 which is preferably of rectangular channel form. The frame is of the proper width to move between the side walls of the body 10. At their front ends the beams 13 are pivotally attached to the side walls in any convenient manner. Thus I have shown a cross pin 16 employed for that purpose. Mounted on the rear cross bar 14 and the cross beam 15 is a housing formed by bending up a metal plate to provide a front wall 17 and two parallel side walls 18.

19 represents the rear axle upon the ends of which are fixed the driving wheels 20. The axle 19 is journaled in the side beams 13 of the supplemental frame and the side walls of the body 10 are notched upwardly as at 21 to provide clearance for the axle 19 when the supplemental frame and the body are forced together to compress the spring. The axle 19 extends through the housing and is provided between the side walls 18 thereof with a pinion 22 which is fixed on the driving axle.

23 represents a relatively large gear having fixed to and coaxial therewith a pinion 24. The said gear and pinion are fixed on a shaft 25 which is journaled in the side walls 18 of the housing, the gear and pinion being mounted between said walls. The gear 23 is arranged to be brought into mesh with the pinion 22, as is hereinafter explained.

26 represents a shaft mounted in the housing at the top thereof, and 27 represents a sector gear whose hub 28 is rotatably mounted on the intermediate portion of said shaft. The ends of the shaft extend beyond the housing at either side, as best shown in Fig. 4.

The toothed perimeter of the sector gear 27 is in mesh with the pinion 24, and the bearings 29 in the side walls 18 of the housing in which the ends of the shaft 25 are journaled, are elongated on a radius struck from the axis of the shaft 26 and are positioned at the rear of the vertical plane passing through the axis of the shaft 26. Thus the shaft 25 may be shifted laterally in its bearings.

Thus when the sector gear 27 swings counter-clockwise in Figs. 2 and 3 the gear 23 and pinion 24 are shifted in the direction of this movement of the sector gear, shifting the shaft 25 laterally toward the right, and thereby unmeshing the gear 23 from the pinion 22.

When the sector gear is moved clockwise the gear 23 and the pinion 24 are moved in the direction of this movement, shifting the shaft 25 toward the left and meshing the gear 23 with the pinion 22.

30 represents a cross head mounted on the sector in the rear of and below its axis of movement. 31 represents a pair of bent leaf springs, one on each side of the housing. The lower and front ends of said springs are fixed as at 32 to the cross beam 15. Said springs bear downwardly on the protruding ends of the shaft 26 and the free ends of said springs are hooked under the cross head 30 at either side of the sector gear 27.

Thus to move the sector gear 27 counter-clockwise the springs 31 are compressed and power is stored therein, and, on the other hand the expansion of the springs, after such compression, drives the sector gear in a clockwise direction.

As the sector gear 27 moves counterclockwise the cross head 30 is received in the slots 33 in the side walls 18, the inner ends of said slots forming stops to limit the counterclockwise movement of the sector gear and the degree of compression of the springs.

The apex of the sector gear 27 is provided with a rearwardly extending finger 34 arranged to engage the top of the wall 17 of the housing, and thus limit the clockwise movement of the sector gear and the expansion of the springs.

When the finger 34 is in engagement with the wall 17 the springs 31 are held under partial or initial tension, thus holding the sector gear stationary.

35 represents a stout cross bar mounted in the upper body 10 and arranged to engage an arcuate recess 36 in the upper edge of the sector gear 27 in the rear of its axis of its movement. The shaft 26 and the bar 35 are parallel.

It is obvious that with the vehicle resting on the floor, if the rear portion of the body 10 be forced down, thus telescoping the body relative to the supplemental frame, the cross bar 35 will force the sector gear counterclockwise thus compressing the springs 31 and rotating the pinion 24 and the gear 23 clockwise, and shifting them toward the right and disengaging the gear 23 from the axle pinion 22. When the force exerted on the body 10 is relieved, the power stored in the springs 31 causes them to expand abruptly, thus rotating the sector gear 27 clockwise and the gear 23 and the pinion 24 counterclockwise. This rotation of the sector gear also shifts the axle 25 toward the left, meshing the gear 23 with the axle pinion 22 and thus spinning the driving wheels clockwise and causing the vehicle to travel in a forward direction.

When the sector gear 27 is halted in its clockwise movement by the engagement of the finger 34 with the wall 17, the sector gear ceases to drive the pinion 24 and the gear 23, but the clockwise movement of the axle pinion 22, assisted by gravity, causes the gear 23 and the pinion 24 and their axle 25 to move to the right and thus the gear 23 is unmeshed from the axle pinion 22 and the driving wheels and their axle continue to rotate and drive the vehicle until their inertia is expended.

To prevent the supplemental frame from dropping down too far, I provide limiting means which may be laterally extending lugs 37 on the beams 13 which move in vertically elongated slots 38 in the lower side walls of the body.

It is obvious that my invention provides a simple, inexpensive but very attractive toy.

I claim:—

1. In a toy vehicle, the combination with a body, of a frame arranged for movement relative to the body, traction-driving wheels supporting the frame, and means to rotate the wheels, and means actuated by relative movement between the frame and the body to store energy to operate the wheel actuating means.

2. In a toy vehicle, the combination with a body, of a frame arranged for movement relative to the body, traction-driving wheels supporting the frame, and a spring spin motor carried by the frame and arranged to be actuated by relative movement between the frame and the body to store energy, and operative connection between the motor and the wheels whereby the release of the energy causes the wheels to rotate and the vehicle to travel.

3. In a toy vehicle, the combination with a body, of a frame arranged for movement relative to the body, an axle journaled on said frame, traction driving wheels mounted on the axle and supporting the frame, a pinion on the axle, a sector-gear mounted on the frame, means actuated by relative motion between the frame and the body for rotating the sector-gear, and a double gear coaxially mounted in said frame and arranged to mesh with the sector gear and the pinion.

4. In a toy vehicle, the combination with a body, of a frame arranged for movement relative to the body, an axle journaled on said frame, traction driving wheels mounted on the axle and supporting the frame, a pinion on the axle, a sector-gear mounted on the frame, means actuated by relative motion between the frame and the body for rotating the sector-gear, a shaft mounted in the frame and arranged for lateral movement, and a double gear mounted coaxially on said shaft, one of said gears being arranged to mesh with the sector gear and the other gear arranged to mesh with the pinion.

5. In a toy vehicle, the combination with a body, of a frame arranged for movement relative to the body, traction driving wheels supporting the frame, a leaf spring mounted in said frame and arranged to be compressed by relative movement between the frame and the body, and operative connection between the leaf spring and the wheels whereby the expansion of the spring causes the vehicle to travel.

6. In a toy vehicle, the combination with a body, of a frame arranged for movement relative to the body, traction driving wheels supporting the frame, a leaf spring mounted in said frame and arranged to be compressed by relative movement between the frame and the body, operative connection between the leaf spring and the wheels whereby the expansion of the spring causes the vehicle to travel, and means for limiting the relative movement between the frame and the body.

7. In a toy vehicle, the combination with the vehicle body, of a frame movable in relation thereto, driving wheels mounted on the frame, a leaf spring mounted on the frame and arranged to be compressed when the body and frame are caused to approach, a sector-gear pivotally mounted on the frame and operatively connected to the driving wheels to rotate the same, and means whereby when the compressed spring is released the sector-gear is driven.

FRANK J. GORIUP.